United States Patent
Nakazawa et al.

[11] 3,971,664
[45] July 27, 1976

[54] FINE GRAIN SILVER HALIDE EMULSIONS WITH POLYHETEONUCLEAR SENSITIZING DYES

[75] Inventors: Yoshiyuki Nakazawa; Yasuharu Nakamura; Tohru Sueyoshi; Akira Sato, all of Minami-ashigara, Japan

[73] Assignee: Fuji Photo Film Co., Ltd., Minami-ashigara, Japan

[22] Filed: Dec. 2, 1974

[21] Appl. No.: 528,597

Related U.S. Application Data

[63] Continuation of Ser. No. 193,138, Oct. 27, 1971, abandoned.

[30] Foreign Application Priority Data
Oct. 27, 1970 Japan............................ 45-94881

[52] U.S. Cl.................... 96/127; 96/27 H; 96/94 R
[51] Int. Cl.² .................. G03C 1/10; G03C 7/14; G03C 1/02
[58] Field of Search.......... 96/127, 27 H, 123, 94 R, 96/141

[56] References Cited
UNITED STATES PATENTS

| | | |
|---|---|---|
| 2,961,318 | 11/1960 | Jones ............................... 96/127 |
| 3,565,630 | 2/1971 | Millikan et al...................... 96/120 |
| 3,661,592 | 5/1972 | Philippaerts et al. ............... 96/94 R |
| 3,674,499 | 7/1972 | Shiba et al. ........................ 96/127 |
| 3,706,566 | 12/1972 | Shiba et al. ........................ 96/120 |

Primary Examiner—David Klein
Assistant Examiner—Richard L. Schilling
Attorney, Agent, or Firm—Sughrue, Rothwell, Mion, Zinn & Macpeak

[57] ABSTRACT

Holographic silver halide elements are disclosed comprising fine silver halide particles spectrally sensitized with dyes sensitive in the 615–660 m$\mu$ region. The dyes are of the formula:

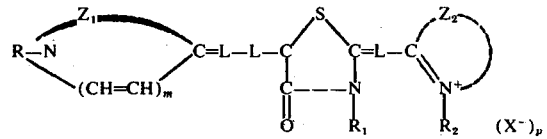

wherein $Z_1$ and $Z_2$ are heterocyclic rings as defined in the specification and R, $R_1$, $R_2$, $R_3$ and L are defined in the specification.

7 Claims, No Drawings

FINE GRAIN SILVER HALIDE EMULSIONS WITH POLYHETERONUCLEAR SENSITIZING DYES

This is a Continuation of application Ser. No. 193,138, filed Oct. 27, 1971, now abandoned.

BACKGROUND OF THE INVENTION

1. Field of the Invention

The present invention relates to a photographic element useful for holographic recording and for reproducing images using coherent rays emitted from lasers, and most especially to photographic emulsions of finely-divided silver halide particles spectrally sensitized by certain kinds of sensitizing dyes which have a high sensitivity in the red-sensitive range of 615–660 m$\mu$.

2. Description of the Prior Art

Sensitive elements used in holographic recording must have sufficient sensitivity to the laser beam used, i.e., they must have a high spectral sensitivity to the wavelength of the laser beam used.

Laser beams have an intrinsic wavelength which depends upon the kind of laser used; that is the substance which is the laser oscillation medium. The laser wavelength usually has a very high monochromatic characteristic.

Nowadays, the lasers most widely used include those using a ruby, a neon and helium gas, an argon gas, a krypton gas and a carbon dioxide gas as the laser oscillation medium. Among these, the laser beam obtained using a neon and helium gases as the laser oscillation medium is most widely used because of low cost and stable out-put. This type of laser is generally termed a neon-helium laser. In holography this neon-helium laser is now most preferably used, as the wavelength of the laser beam emitted from a neon-helium laser is 632.8 m$\mu$ in most cases.

It is necessary that a sensitive silver halide photographic element suitable for holographic recording using a neon-helium laser have a high spectral sensitivity to the 632.8 m$\mu$ wavelength of the neon-helium laser. Further, it is required that the sensitive element have a high resolving power because the space frequency of a holographic image to be recorded and reproduced usually exceeds 1000/mm. Accordingly, it is necessary that such a photographic emulsion have very low light scattering. Moreover, such a photographic emulsion should have an extremely low image granulation. In order to satisfy these conditions, it is necessary to use photographic emulsions containing extremely fine silver halide particles, namely those having an average particle size below 0.1 micron.

A problem is encountered in sensitizing such emulsions comprising extremely fine silver halide particles. Specifically, sensitizing dyes which afford an excellent spectral sensitization function to silver halide emulsions of a comparatively large particle size do not always afford an excellent spectral sensitization function to the silver halide emulsions of such small particle size.

Accordingly, for high resolution holographic recording and reproduction, it is necessary to discover sensitizing dyes which provide an excellent spectral sensitization function to silver halide photographic emulsions having a very small particle size.

SUMMARY OF THE INVENTION

The present inventors have found that high spectral sensitivity to monochromatic light of 632.8 m$\mu$ emitted from a neon-helium laser is obtained when a silver halide emulsion in which the average particle size of the silver halide particles by number is not greater than 0.18 micron in diameter, or wherein 95% by number of the silver halide particles are not greater than 0.2 micron in diameter, is spectrally sensitized with a certain type of sensitizing dye. Such fine particles as employed in the present invention are spherical.

Accordingly, one object of the present invention is to provide a silver halide photographic emulsion comprising fine silver halide particles having a high spectral sensitivity to monochromatic light of 632.8 m$\mu$ emitted from a neon-helium laser, more generally to such emulsions having a high spectral sensitivity to coherent neon-helium laser emissions of a wavelength of 615 m$\mu$ – about 660 m$\mu$ by spectrally sensitizing such fine particle silver halide emulsions using certain types of sensitizing dyes.

These objects have been attained by adding at least one sensitizing dye represented by the following formula to silver halide emulsions in which the average particle size of the silver halide particles by number is not greater than 0.18 micron in diameter or wherein at least 95% by number of the silver halide particles have particle sizes not greater than 0.2 micron in diameter. Alternatively, the preferable particle size is about 0.1 micron.

SENSITIZING DYE

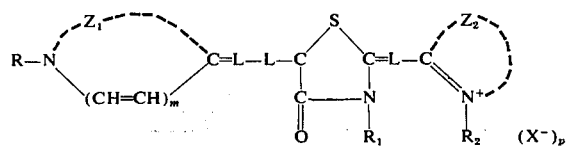

wherein $Z_1$ represents the atoms necessary to form any 5-membered or 6-membered heterocyclic ring conventionally employed in cyanine dyes. Representative of such heterocyclic rings are the pyridine nucleus, thiazole nucleus, selenazole nucleus, benzothiazole nucleus, benzoselenazole nucleus, naphthothiazole nucleus, naphthoselenazole nucleus and quinoline nucleus, which may be substituted with any desired substituent which do not shift the spectral sensitization wavelength of the dye outside of the neon-helium laser wavelength and which is compatible with the silver halide emulsion, such as lower alkyl (e.g. methyl), alkoxy (e.g. methoxycarbonyl), trifluoromethyl, cyano, methyl sulfonyl ( $-SO_2 CH_3$), sulfamyl (e.g. $-SO_2NHC_2H_5$), carbamyl (e.g. $-CONHC_2H_5$), etc; $Z_2$ represents the atoms necessary to form a nucleus selected from the group consisting of a thiazoline nucleus, an oxazole nucleus, a benzoxazole nucleus, a thiazole nucleus, a selenazole nucleus, a benzothiazole nucleus, a benzoselenazole nucleus, a napththothiazole nucleus and a naphthoselenazole nucleus, which may be substituted with any desired substituents having the same properties as those described in $Z_1$; R and $R_1$ represent a lower alkyl group having preferably up to four carbon atoms, such as methyl, ethyl, n -propyl etc., a hydroxy alkyl group such as $\beta$ -hydroxyethyl etc., an alkoxy alkyl group such as $\beta$ -methoxyethyl etc., an acetoxy alkyl group such as $\beta$ -acetoxy ethyl etc., a carboxy-alkyl group such as $\beta$ -carboxyethyl, $\gamma$-carboxypropyl, $\delta$-carboxy butyl, $\omega$-carboxypenyl etc., a sulfoalkyl group such as $\beta$-sulfoethyl, $\gamma$-sulfopropyl, $\gamma$-sulfobutyl, $\delta$-sulfobutyl, $\omega$-sulfopentyl, etc., an allyl group such as vinyl methyl etc., an aralkyl group such as benzyl, phenylethyl, p-carboxyphenylethyl, p-sulfophenylethyl etc., and equivalent groups, wherein the alkyl moiety has preferably up to four carbon atoms;

$R_2$ represents an alkyl group (such as methyl, ethyl, benzyl, vinylmethyl etc.) or an aryl group such as phenyl, the above-said alkyl moiety having preferably up to four carbon atoms;

L represents a methine group or

wherein $R_3$ represents an alkyl group (such as methyl, ethyl, etc., ) an alkoxyalkyl group (e.g. ethoxyethyl, etc.), or an aryl group (such as phenyl, o-carboxyphenyl, etc.), the above-said alkyl moiety having preferably up to four carbon atoms; L and R and L and $R_1$ may also be joined together by a methylene chain;

$m$ represents 0 or 1;

X represents an anion conventionally employed in cyanine dyes, e.g., a chlorine ion, bromine ion, iodine ion, perchlorate ion, methyl sulfate ion, p-toluene sulfonate ion, etc;

$p$ represents 0 to 1, with $p$ being 0 when the compound is in the form of an inner salt.

DETAILED DESCRIPTION OF THE INVENTION

In the following description, typical sensitizing dyes used in the present invention are described. However, the sensitizing dyes as may be used in the present invention are not intended to be limited thereby.

DYE 1

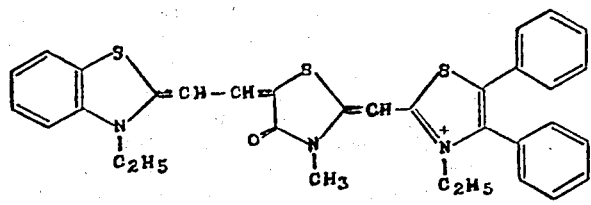

DYE 2

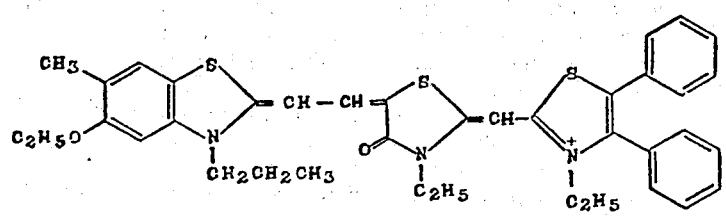

DYE 3

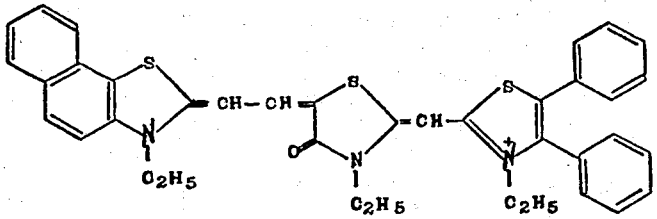

DYE 4

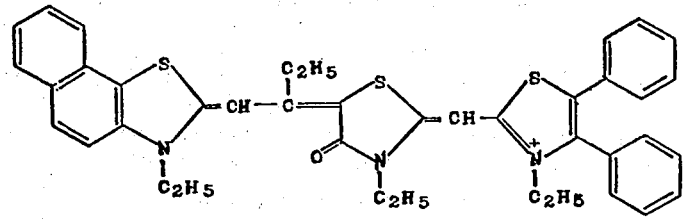

DYE 5
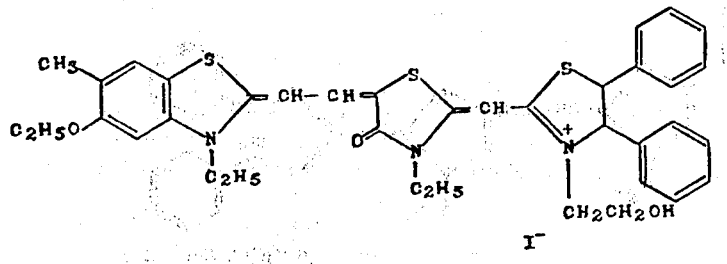
DYE 6
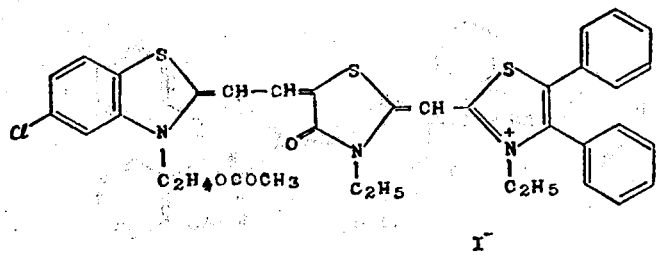
DYE 7
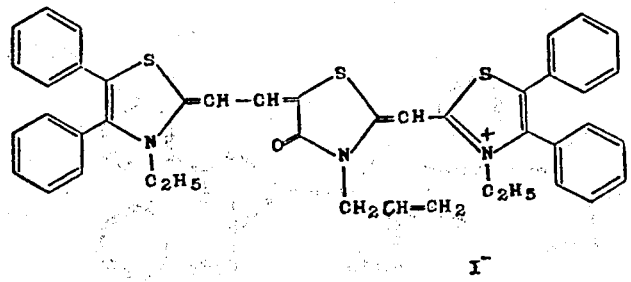
DYE 8
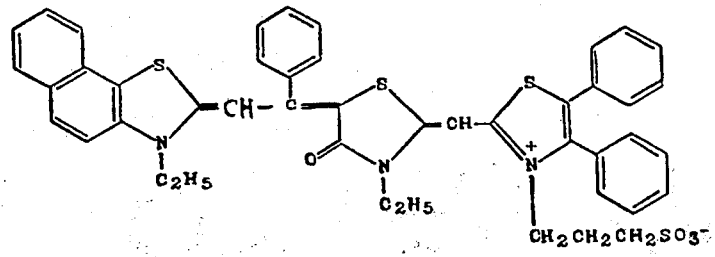
DYE 9
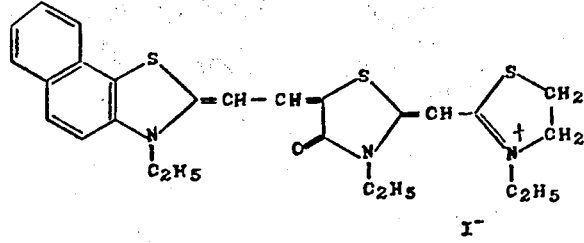
DYE 10
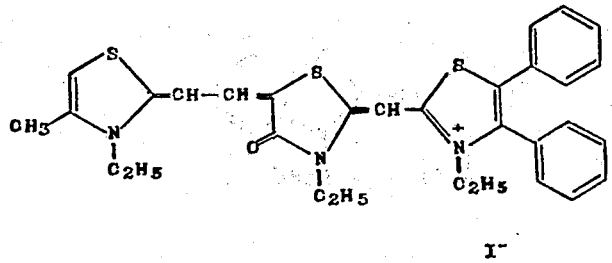

DYE 11
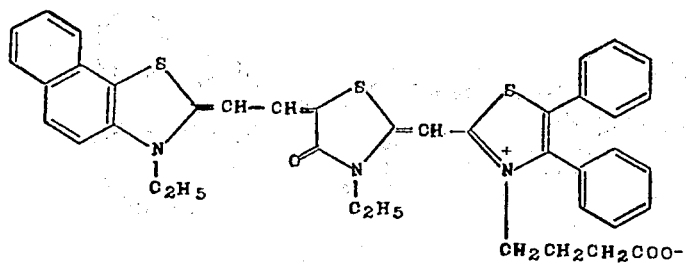
DYE 12
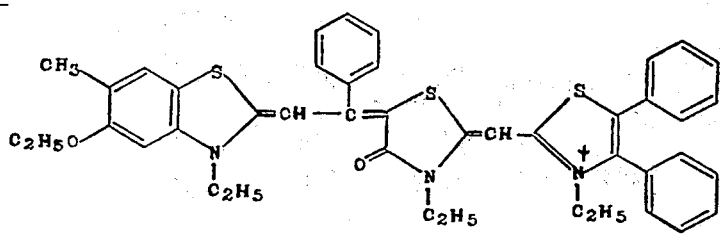
DYE 13
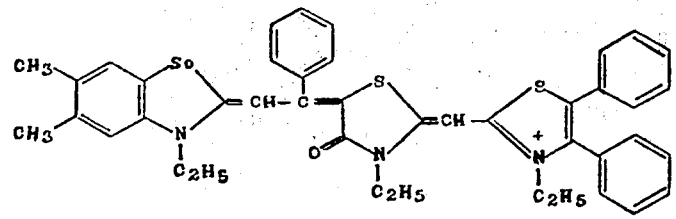
DYE 14
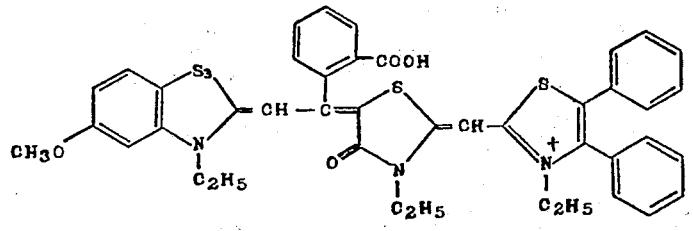
DYE 15
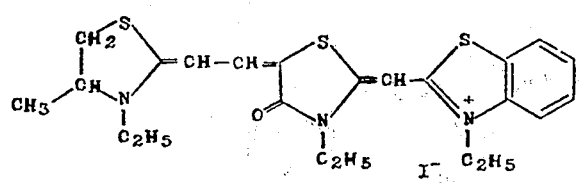

DYE 16
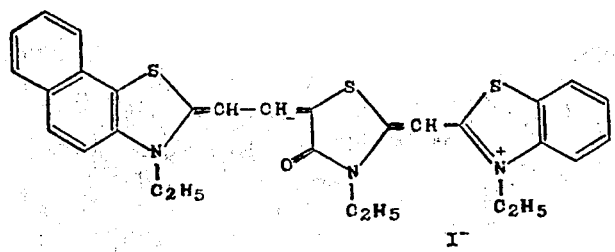
DYE 17
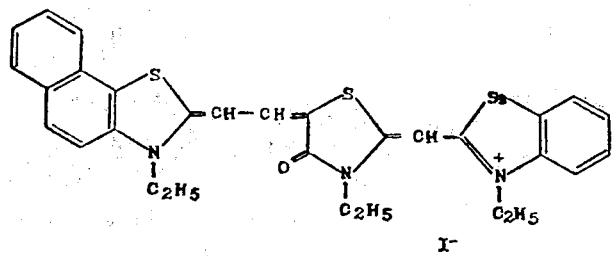
DYE 18
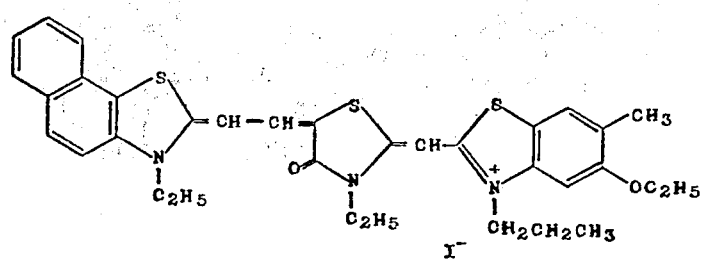
DYE 19
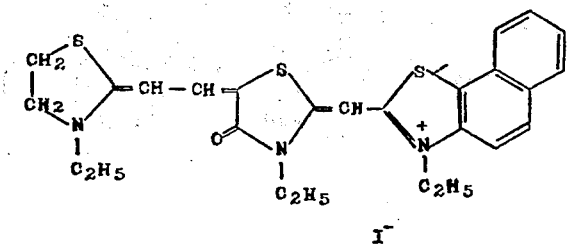
DYE 20
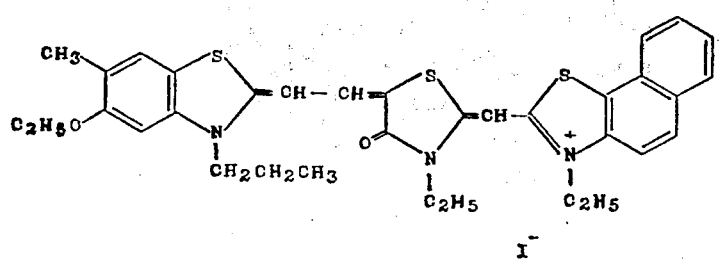

DYE 21
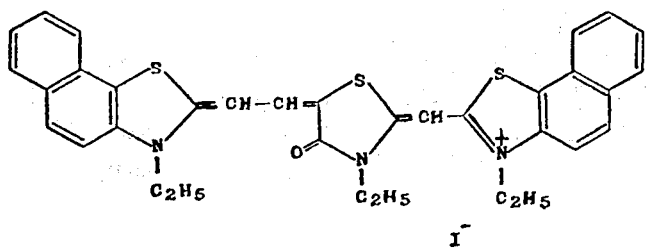
DYE 22
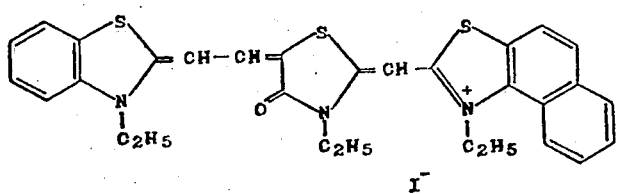
DYE 23
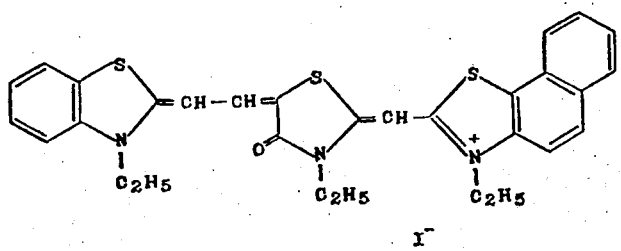
DYE 24
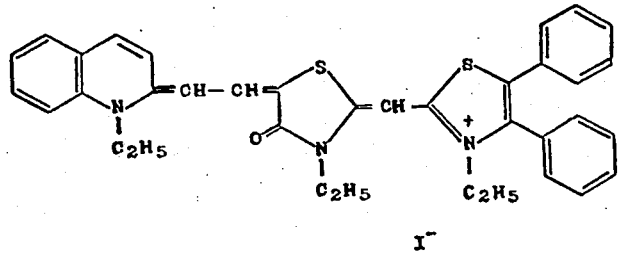
DYE 25
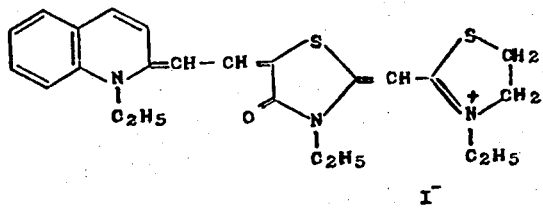

DYE 26
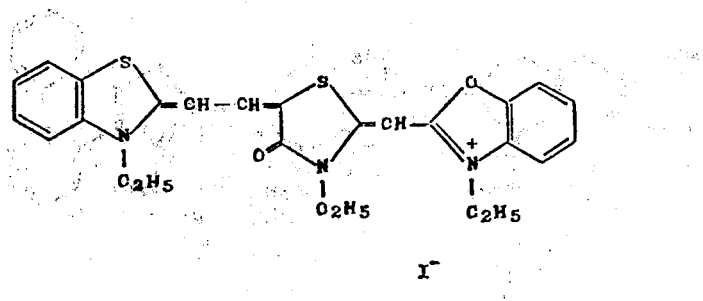
DYE 27
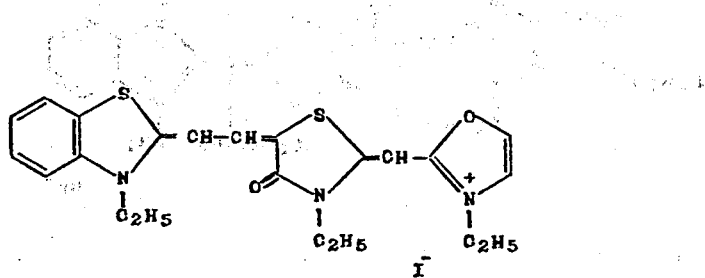
DYE 28
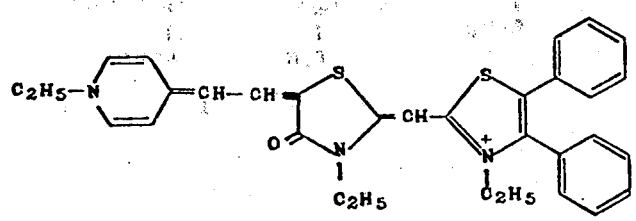
DYE 29
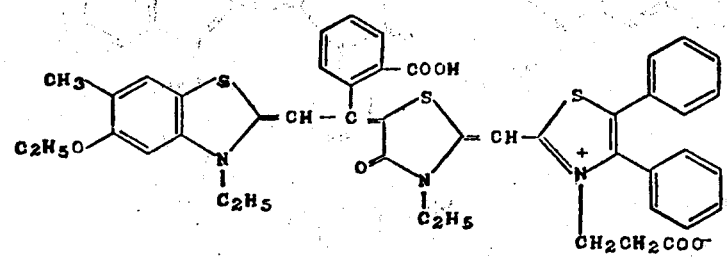
DYE 30
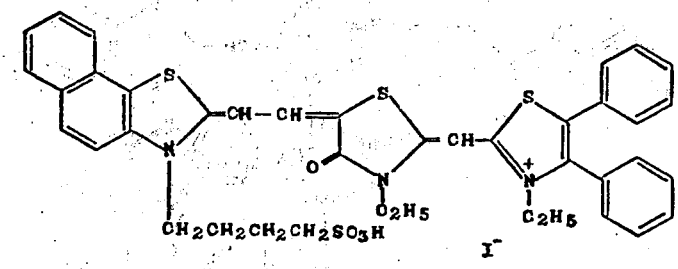

DYE 31
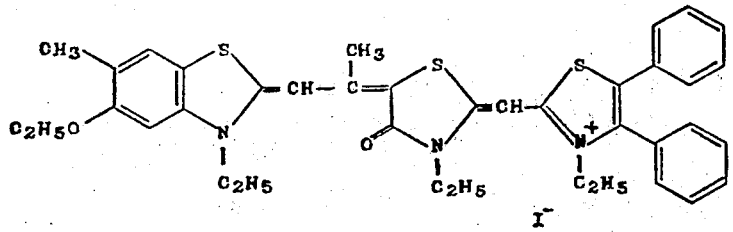
DYE 32
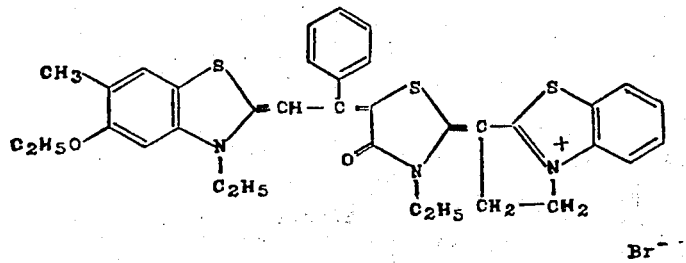
DYE 33
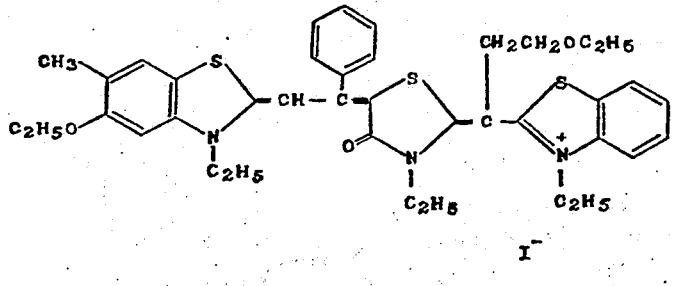
DYE 34
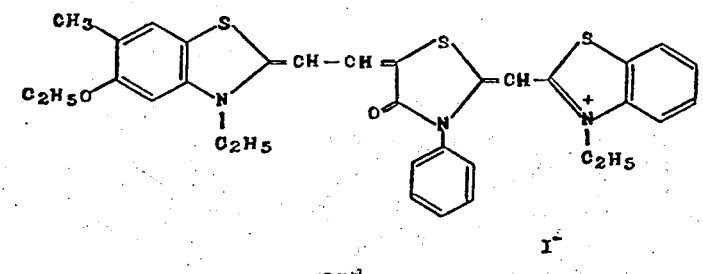
and
DYE 35
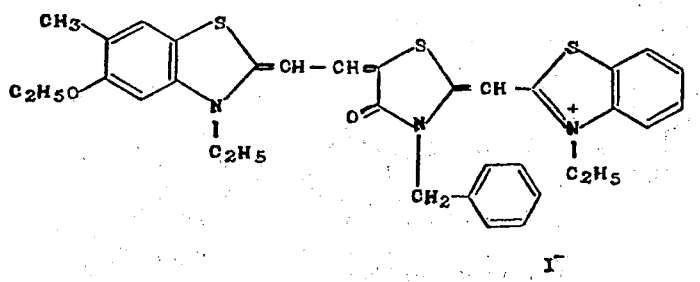

The sensitizing dyes used in the present invention are known and can be synthesized easily by persons skilled in the art, with the formation procedure being described in, e.g., "The Cyanine Dyes and Related Compounds" written by Frances M. Hamer, John Wiley and Sons Ltd. (1964).

The silver halide emulsions used in the present invention in which the average particle size of the silver halide crystal particles by number is not greater than 0.18 micron (in diameter) or wherein 95% by number of the silver halide particles have particle sizes not greater than 0.2 micron in diameter can be spectrally sensitized very effectively by the sensitizing dyes used in the present invention.

The spectral sensitization of the present invention is especially effective for gelatin-silver halide emulsions. However, it is also effectively employed with silver halide emulsions containing other hydrophilic colloids such as agar agar, collodion, water soluble cellulose derivatives, polyvinyl alcohol, polyacrylamides and other synthetic or natural hydrophilic resins. The amount thereof is in accordance with art recognized amounts.

As for the silver halide emulsions used in the present invention, any of those containing silver chloride, silver chloride-bromide, silver bromide and silver iodide-bromide-chloride may be used in addition to mixtures thereof. However, best results are obtained using a silver bromide or silver iodide-bromide emulsion.

In order to prepare the silver halide photographic emulsions which are spectrally sensitized in accordance with the present invention, one or more sensitizing dyes can be added to the emulsion by any known prior art process. The emulsions can be chemically sensitized by adding one or more sulfur compounds, noble metal complex salts and reducing compounds as are known to the art.

It is generally most convenient to add the sensitizing dyes as a solution dissolved in a suitable solvent, such as methanol and ethanol, to the emulsions. The amount of sensitizing dyes present in the emulsions can vary widely within from about 5 to about 500 mg of sensitizing dye (s) per kg of the silver halide emulsion including most useful commercial forms.

The silver halide photographic emulsions of the present invention may also be subjected to hypersensitization or supersensitization as these terms are understood to the art.

In preparing silver halide photographic emulsions in accordance with the present invention, additives commonly used in the art may be so used for their known functions, e.g., other chemical sensitizers, stabilizers, fog inhibitors, toning agents, hardening agents, surface active agents, plasticizers, antistatic agents, lubricants, development accelerators, color formers and fluorescent whitening agents.

The present invention will now be explained in greater detail by the following examples which are to be taken as only illustrative of the broad scope of the present invention.

EXAMPLE 1

A silver halide photographic emulsion was produced by adding sensitizing dyes as exemplified above (refer to Table 3) to a silver iodide-bromide emulsion (AgI:AgBr = 1 mole : 99 moles) in which the average particle size of the silver halide particles by number was 0.06 micron in diameter. The product was coated onto a cellulose triacetate film base and dried.

Sensitivity to a coherent neon-helium laser beam (wavelength : 632.8 m$\mu$) can be determined from a curve of log (Amount of exposure) - D determined by applying the laser beam emitted from the laser tube to a revolving lightscattering plate, thereby exposing the sensitive element by the laser beam passed therethrough, developing and measuring the photographic density (D) by means of an optical densitometer. However, this method is not suitable for determining sensitivity of a large number of samples because it requires a great amount of the time as exposure takes place in a point by point manner. Thus, in this example, the above-mentioned sample was exposed to a tungsten source ray having an intensity of 8000 luxes (2854°K) by passing the tungsten ray through an interference filter (T max 633 m$\mu$: $\Delta\lambda 1/2$ 2.5 m) which provides a red light of 633 m$\mu$ wavelength (corresponding to the monochromatic ray of a neon-helium laser), and thereafter developing the emulsions. A developer having the formulation shown in Table 2 was used.

Table 2

| | |
|---|---|
| Metol | 2 g |
| Hydroquinone | 8.8 g |
| Anhydrous sodium sulfite | 96 g |
| Anhydrous sodium carbonate | 48 g |
| Potassium bromide | 5 g |
| Water to make | 1 liter |

For nearly equal wavelengths, sensitivity to a coherent laser ray and sensitivity to an incoherent tungsten ray are theoretically different in some degree. However, experimental date up to three figures is identical for both sources. This will be understood from the following experiment whether intensity of both coherent laser and an incoherent tungsten beam rays was controlled by a thermopile to be identical and microfilms were exposed therewith. The time of exposrue necessary to obtain identical density was 13.5 seconds for the tungsten light beam and 13.3 seconds for the laser beam, a difference within the range of experimental error.

In Table 3, the red sensitivity and the maximum sensitization obtained upon adding the sensitizing dyes of the present invention are shown. In Table 4, the red sensitivity of typical dyes is provided to form the basis of a comparison with the dyes of the present invention. The same AgBrI emulsion was used.

Table 3

| Dye | Amount/ silver 29g | Emulsion | Average particle size | Red-sensitivity | Maximum sensitization wavelength |
|---|---|---|---|---|---|
| 1 | 3.2×10⁻⁵ | AgBrI | 0.06 $\mu$ | 500 | 624 m$\mu$ |

Table 3-continued

| Dye | Amount/ silver 29g | Emulsion | Average particle size | Red-sensitivity | Maximum sensitization wavelength |
| --- | --- | --- | --- | --- | --- |
|  | gram mol |  |  |  |  |
| 2 | " | " | " | 1800 | 642 |
| 3 | " | " | " | 1850 | 644 |
| 4 | " | " | " | 1850 | 643 |
| 5 | " | " | " | 1700 | 640 |
| 6 | " | " | " | 610 | 625 |
| 7 | " | " | " | 1840 | 644 |
| 8 | " | " | " | 1200 | 642 |
| 9 | " | " | " | 880 | 615 |
| 10 | " | " | " | 890 | 638 |
| 11 | " | " | " | 1750 | 644 |
| 12 | " | " | " | 1200 | 654 |
| 13 | " | " | " | 1100 | 650 |
| 14 | " | " | " | 1250 | 650 |
| 15 | " | " | " | 1000 | 644 |
| 16 | " | " | " | 730 | 650 |
| 17 | " | " | " | 730 | 652 |
| 18 | " | " | " | 660 | 655 |
| 19 | " | " | " | 610 | 650 |
| 20 | " | " | " | 420 | 658 |
| 21 | " | " | " | 880 | 660 |
| 22 | " | " | " | 650 | 642 |
| 23 | " | " | " | 610 | 640 |
| 24 | " | " | " | 1500 | 638 |
| 25 | " | " | " | 1300 | 638 |
| 26 | " | " | " | 400 | 618 |
| 27 | " | " | " | 400 | 615 |
| 28 | " | " | " | 950 | 656 |
| 29 | " | " | " | 1600 | 640 |
| 30 | " | " | " | 1750 | 644 |
| 31 | " | " | " | 1800 | 642 |
| 32 | " | " | " | 900 | 655 |
| 33 | " | " | " | 800 | 654 |
| 34 | " | " | " | 600 | 658 |
| 35 | " | " | " | 550 | 655 |

The value of red sensitivity is shown as the relative sensitivity to that of Comparison dye B (100) upon exposure of the same to the tungsten light beam heretofore described using an interference filter (T max 633 m$\mu$, $\Delta\lambda 1/2$ 2.5 m$\mu$.)

Table 4

| Dye | amount/ silver 29g | Emulsion | Average particle size | Red-sensiitivity | Maximum sensitization |
| --- | --- | --- | --- | --- | --- |
| 2 | 1/5000 mol (methanol solution 4 cc) | AgBrI | 0.06 $\mu$ | 1800 | 642 m$\mu$ |
| 3 | " | " | " | 1850 | 644 |
| 28 | " | " | " | 950 | 656 |
| A | " | " | " | 50 | 658 |
| B | " | " | " | 100 | 638 |

The chemical formulae of sensitizing dyes A and B exemplified as comparison dyes are as follows:

EXAMPLE 2

Sensitive elements separately containing Sensitizing dyes 2 and 3 and Comparison dyes A and B, produced in accordance with Example 1, were exposed using a neon-helium laser (single mode) having a 50 mW output. They were then developed using a developer having the formulation described in Table 2.

A 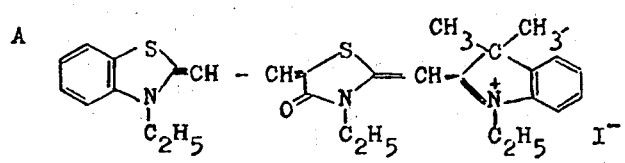

B 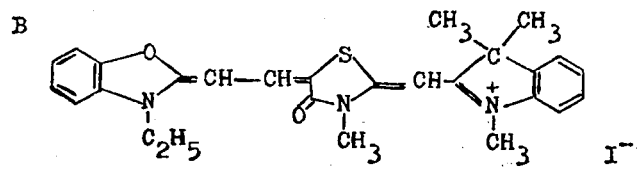

The time of exposure necessary to obtain an identical density was as in Table 5.

Table 5

| Sensitizing dye | Time of exposure* |
|---|---|
| 2 | 1 second |
| 3 | 1 second |
| A | 36 seconds |
| B | 18 seconds |

As shown in Table 5, the time of exposure for sensitizing dye 2 or 3 is shorter than that in case of Comparison dye A or B, i.e., the former have a higher sensitivity to the neon-helium laser than the latter.

As a result of shortening the time of exposure, distinct holograms can be obtained since image dimness caused by minute vibration of the apparatus is minimized.

What is claimed is:

1. In a process for increasing the spectral sensitivity of a fine grain silver halide emulsion to monochromatic light emitted from a neon-helium laser, the numerical average grain size of the silver halide of said fine grain silver halide emulsion being not greater than 0.18 micron in diameter or at least 95% by number of the silver halide particles having particle sizes not greater than 0.2 micron in diameter, the improvement comprising adding to said emulsion a sufficient amount of at least one sensitizing dye represented by the following formula (I)

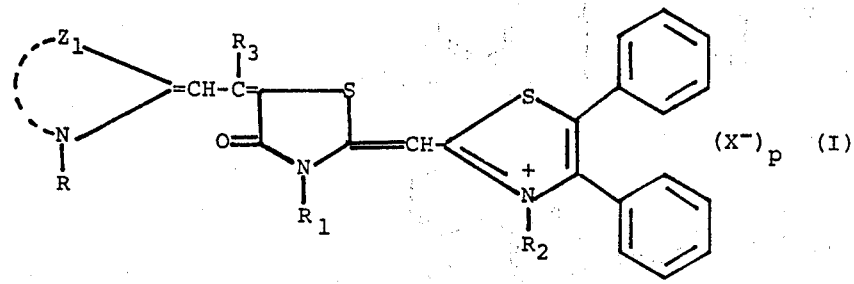

wherein $Z_1$ represents the group of atoms necessary to form a heterocyclic nucleus selected from the group consisting of a 4,5-diphenyl thiazole nucleus, a benzothiazole nucleus, benzoselenazole nucleus, a naphtho[2,1-d]thiazole nucleus, and a 2-quinoline nucleus, said benzothiazole or benzoselenazole nucleus being substituted by at least one alkoxy group; R and $R_1$ each represents a lower alkyl group, a hydroxyalkyl group, an alkoxyalkyl group, an acetoxyalkyl group, a carboxyalkyl group, a sulfoalkyl group, an aralkyl group, or an allyl group; $R_2$ represents an alkyl group, a carboxyalkyl group, a sulfoalkyl group or an aryl group; $R_3$ represents a hydrogen atom, a lower alkyl group or a carboxyaryl group; X represents an anion; and p represents 0 or 1, p being 0 when the compound forms an inner salt; or represented by the following formula:

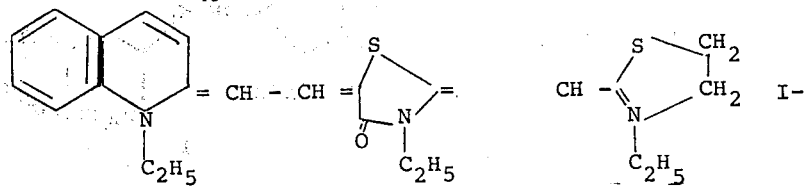

2. The process of claim 1, wherein R and $R_1$ each represents a lower alkyl group, an acetoxyalkyl group, a sulfoalkyl group or an allyl group and $R_2$ represents an alkyl group, a carboxyalkyl group or a sulfoalkyl group.

3. The process of claim 2, wherein the numerical average grain size of the silver halide or the particle size of at least 95% by number of the silver halide particles is not greater than 0.1 micron in diameter.

4. The process of claim 2, wherein the alkyl moiety of the substituents represented by R, $R_1$, $R_2$ or $R_3$ has up to four carbon atoms.

5. The process of claim 2, wherein $R_2$ is a methyl group, an ethyl group, a benzyl group, a vinylmethyl group or a phenyl group; and wherein $R_3$ is a methyl group or an ethyl group.

6. The process of claim 1, wherein the sensitizing dye is selected from the group consisting of

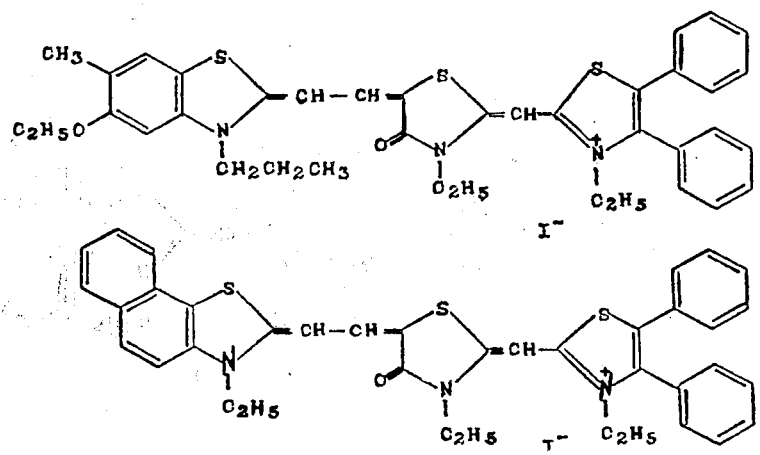

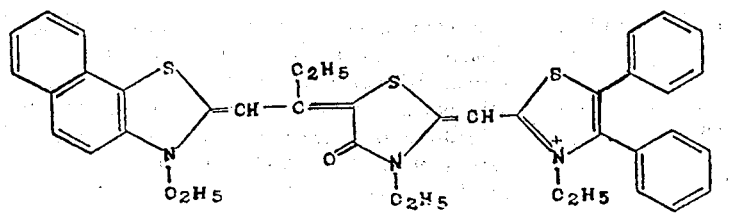
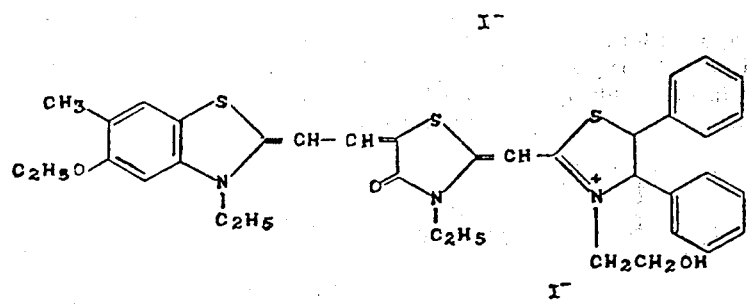
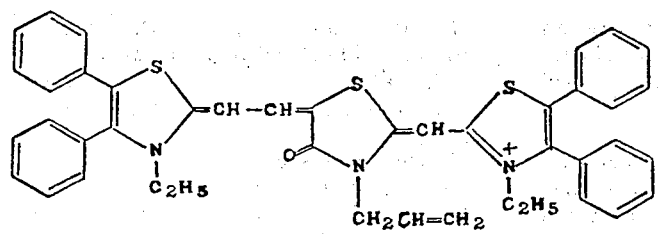
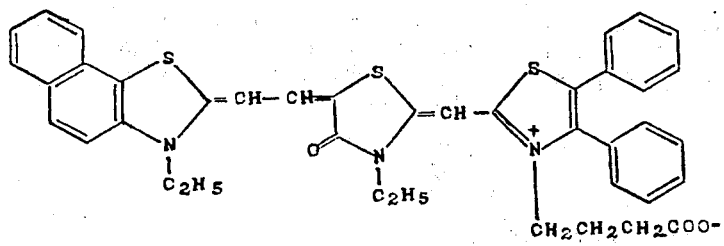
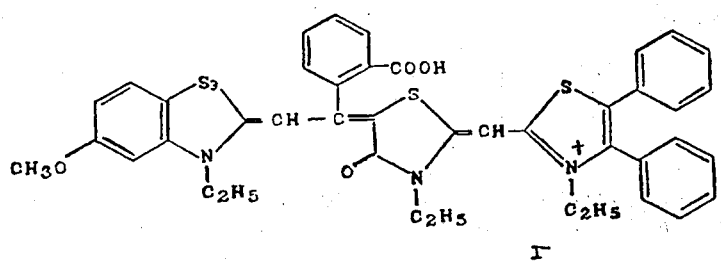
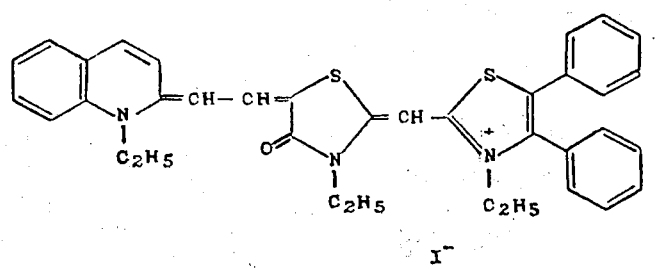

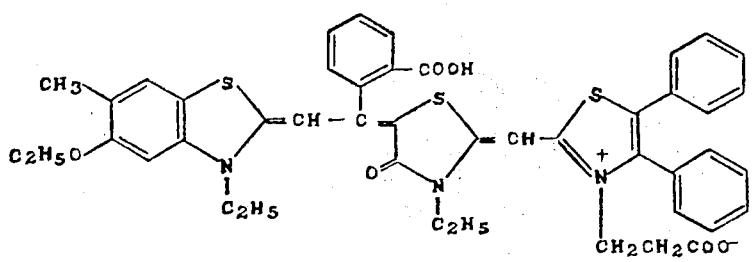
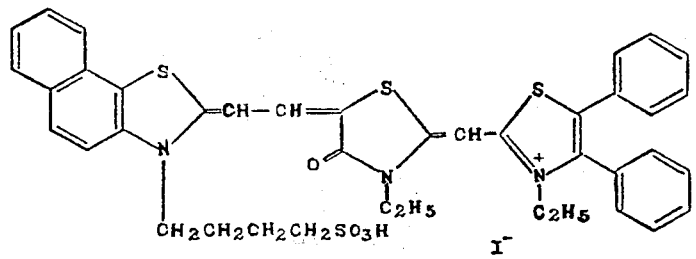
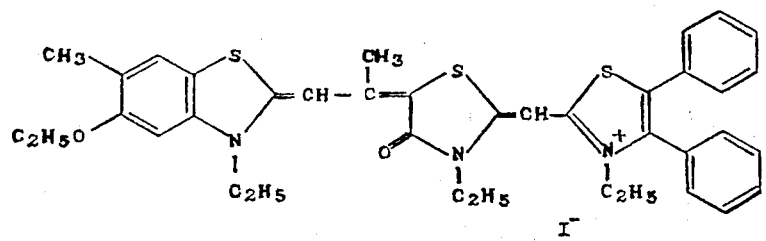
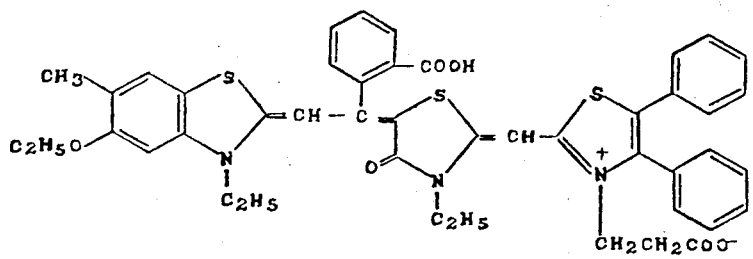
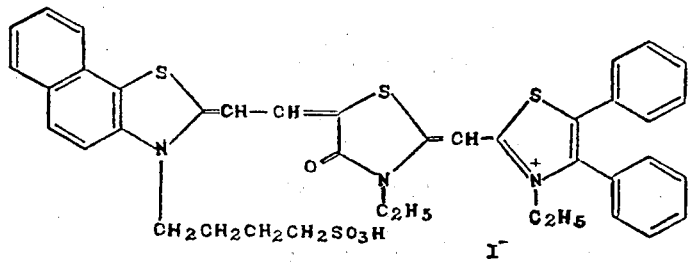
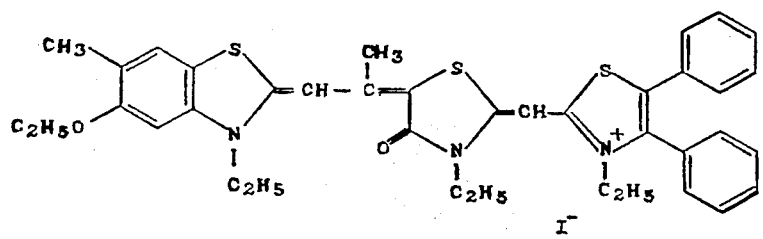
7. The process of claim 2, wherein said silver halide emulsion is a silver bromide or silver-iodobromide gelatino emulsion.
* * * * *